United States Patent
Bhakta et al.

(10) Patent No.: US 7,882,182 B2
(45) Date of Patent: Feb. 1, 2011

(54) CORRECTING INFORMATION IN A RECEIVED ELECTRONIC MAIL

(75) Inventors: Dharmesh N. Bhakta, Austin, TX (US); Trung Q. Ly, Austin, TX (US); Juan Francisco Obas, Austin, TX (US); Lakshmi N. Potluri, Austin, TX (US); Guillermo Jesus Silva, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1258 days.

(21) Appl. No.: 11/269,193

(22) Filed: Nov. 8, 2005

(65) Prior Publication Data

US 2007/0106730 A1    May 10, 2007

(51) Int. Cl.
G06F 15/16    (2006.01)

(52) U.S. Cl. ...................... 709/206; 709/203

(58) Field of Classification Search ................. 709/206, 709/203, 207; 715/748
See application file for complete search history.

(56) References Cited

U.S. PATENT DOCUMENTS

| | | | | |
|---|---|---|---|---|
| 5,870,548 A * | 2/1999 | Nielsen | ...................... | 709/206 |
| 6,065,026 A * | 5/2000 | Cornelia et al. | ............. | 715/202 |
| 2002/0023138 A1 | 2/2002 | Quine et al. | | |
| 2002/0049793 A1* | 4/2002 | Okumura et al. | ............ | 707/526 |
| 2002/0065891 A1* | 5/2002 | Malik | ......................... | 709/206 |
| 2002/0099777 A1* | 7/2002 | Gupta et al. | ................ | 709/206 |
| 2002/0194278 A1* | 12/2002 | Golan | ........................ | 709/206 |
| 2003/0037114 A1* | 2/2003 | Nishio et al. | ................. | 709/206 |
| 2003/0212749 A1* | 11/2003 | Jenkins et al. | .............. | 709/206 |
| 2004/0083230 A1 | 4/2004 | Caughey | | |
| 2005/0268237 A1* | 12/2005 | Crane et al. | ................. | 715/732 |
| 2007/0106731 A1 | 5/2007 | Bhakta et al. | | |

OTHER PUBLICATIONS

"G-Lock Software" http://www.hot-shareware.com/internet-tools/glock-email-processor/index.html, retrieved Oct. 3, 2005, pp. 1-2.
"G-Lock Email Processor" http://www.glocksoft.com/amlv/index.htm, retrieved Oct. 3, 2005, pp. 1-3.
"BounceMailmanager 1.0—Identify and Retrieve undeliverable bounce . . . ", 2003-2004, http://www.soft411.com/company/Mailsbroadcast-dotcom/BounceMailmanager.htm, retrieved Oct. 3, 2005, pp. 1-2.
Postel, "Simple Mail Transfer Protocol", RFC 821, Aug. 1982, Marina del Rey, CA, pp. 1-46.
Crocker, "Standard for the format of ARPA Internet text messages", RFC 822, Aug. 1982, Newark DE, pp. 1-42.
Resnick, "Internet Message Format", RFC 2822, The Internet Society, Apr. 2001, pp. 1-40.

* cited by examiner

*Primary Examiner*—Joon H Hwang
*Assistant Examiner*—Jasmine Myers
(74) *Attorney, Agent, or Firm*—Yee & Associates, P.C.; Davis A. Mims, Jr.

(57) ABSTRACT

Correcting information in an electronic mail of a recipient and sending notification of the corrected information. Information is corrected in a received e-mail by a recipient of the received e-mail, and a correction note is generated that contains the correction. The correction note is used by a correcting user agent to correct information in the received e-mail for any other recipients and the sender of the received e-mail. The correction note is sent to the other recipients and the sender of the received e-mail.

8 Claims, 6 Drawing Sheets

CORRECTING INFORMATION IN A RECEIVED ELECTRONIC MAIL

BACKGROUND OF THE INVENTION

1. Field of the Invention

The present invention relates generally to an improved data processing system for optimizing performance in a data processing system. Still more particularly, the present invention provides for the correction of information in a received electronic mail.

2. Description of the Related Art:

As the Internet has matured, so has electronic mail which is also referred to as e-mail. However, humans make errors even with features such as e-mail spell checkers and other tools provided by e-mail client software known as e-mail clients. One example of a human error that may occur is when an e-mail user acts as an e-mail sender by sending out an e-mail to a group of e-mail recipients and enters erroneous information in the e-mail. Erroneous information in an e-mail may be mistyped text, erroneous information may be omitted information, or erroneous information may be any included or attached information that an e-mail sender believes to be correct but which is actually incorrect.

If the e-mail sender enters erroneous information in an e-mail addressed to only one e-mail recipient, the solution is manageable. After detecting the erroneous information in the e-mail, the sender may correct the erroneous information in a copy of the e-mail and re-send the corrected copy of the e-mail to the e-mail recipient.

However, when an e-mail sender sends out an e-mail to a group of e-mail recipients and enters erroneous information in the e-mail, additional problems may arise. One such problem is illustrated by the following example. An e-mail sender, Oprah, sends out an e-mail to the following e-mail recipients: Bob, Sam, and John, whose e-mail addresses are bob@abc.net, sam@ibm.com, and johni@ln.abc.net, respectively. However, Oprah enters erroneous information in the e-mail, such as an erroneous street address for a meeting.

John, one of the recipients, may detect the erroneous information in the e-mail and correct the erroneous information in a copy of the e-mail. John has a first option of sending a copy of the corrected e-mail with the corrected information to all of the other original recipients, Bob and Sam, as well as the e-mail sender, Oprah. John also has a second option of sending a copy of the corrected e-mail with the corrected information to Oprah alone, which is an often used approach. A received e-mail is an e-mail that a mail server has transferred to the e-mail client for the e-mail recipient. An e-mail recipient of a received e-mail is anyone whose e-mail client received the transferred e-mail.

The problem with the first option is that both Bob and Sam will receive two e-mails with essentially the same content, the original e-mail with the erroneous information, and the second corrected e-mail with the corrected information and essentially the same content as the original e-mail. This problem is amplified when the e-mail sender sends the e-mail to a large number of intended e-mail recipients. The problem with the second option occurs if Oprah does not notify Bob or Sam in time of the correction made by John to the erroneous information. Bob and Sam may act upon the erroneous information in the original e-mail under the second option because Bob and Sam have only the original e-mail with the erroneous information.

These and similar problems result in greater overhead in terms of data transmission in addition to a tedious correction process.

SUMMARY OF THE INVENTION

Embodiments of the present invention provide for correcting information in a received electronic mail. Responsive to a correction of information in the received e-mail by a recipient of the received e-mail, a correction note is generated that contains the correction. The correction note is sent to any other recipients and a sender of the received e-mail, wherein the correction note is used by a correcting user agent to correct information in the received e-mail for the other recipients and the sender of the received e-mail.

BRIEF DESCRIPTION OF THE DRAWINGS

The novel features believed characteristic of the invention are set forth in the appended claims. The invention as well as an illustrative mode of use, will best be understood by reference to the following detailed description of an illustrative embodiment when read in conjunction with the accompanying drawings, wherein:

FIG. 7A-7B is a flowchart of a process for a correcting user agent that enables an e-mail recipient to correct erroneous information for a received e-mail in accordance with an illustrative embodiment of the present invention.

DETAILED DESCRIPTION OF THE PREFERRED EMBODIMENT

Figure 1:
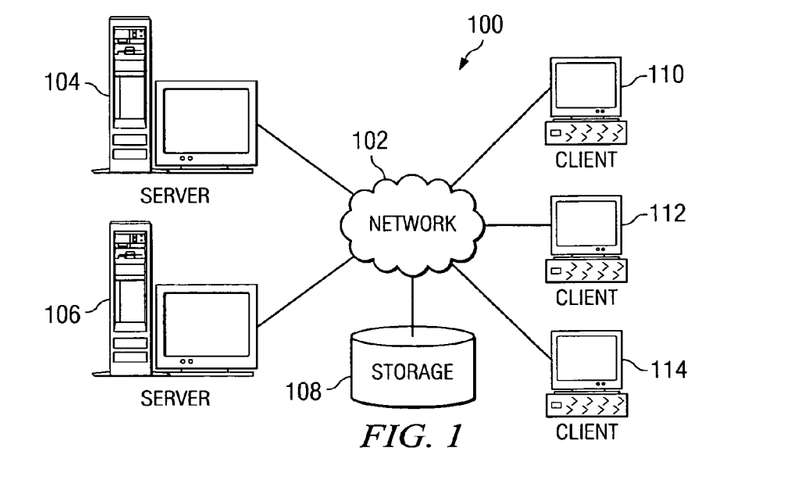
FIG. 1 is a pictorial representation of a data processing system in which the present invention may be implemented in accordance with an illustrative embodiment of the present invention.
Figure 2:
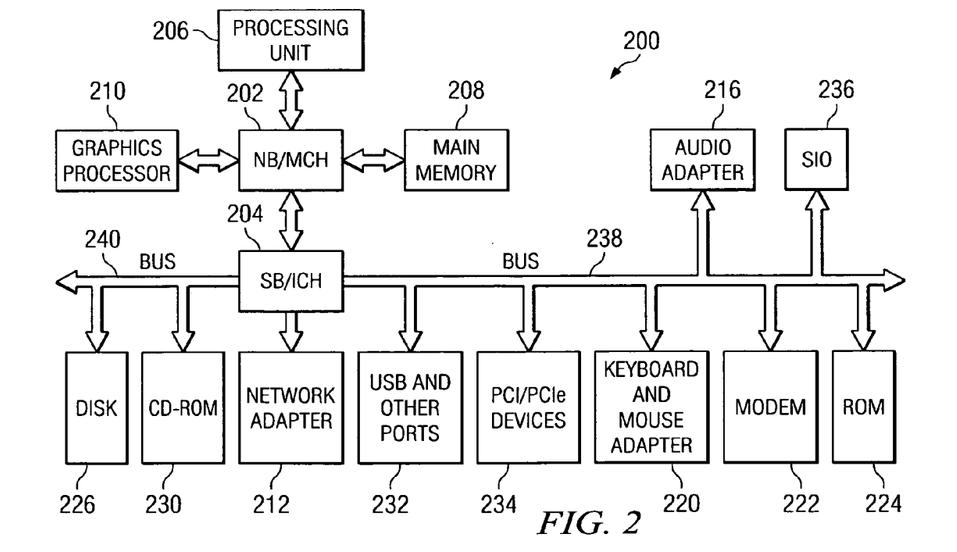
FIG. 2 is a block diagram of a data processing system that may be implemented as a server in which the present invention may be implemented in accordance with an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communication links between various devices and computers connected together within network data processing system 100.

Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 maybe connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more busses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or LAN 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Embodiments of the present invention may be implemented using components of the network for the data processing system in FIG. 1, such as server 104 or storage 106. These embodiments may be implemented to serve the users of a network such as network 102 for the data processing system in FIG. 1, such as client 110, client 112, or client 114.

Illustrative embodiments of the present invention provide a method for e-mail recipients to seamlessly integrate corrections to erroneous information or additions to incomplete information in received e-mails. After an e-mail sender has entered erroneous information when sending an e-mail an e-mail recipient corrects the erroneous information. Embodiments of the present invention offer the capability to correct the erroneous information in the received e-mail in the remote mailboxes of the other e-mail recipients of the received e-mail and the e-mail sender. This correction eliminates the need for the e-mail sender to resend a correction to a copy of the received e-mail to all of the other original e-mail recipients. A mail server is a computer program or software agent that transfers electronic mail from one computer to another computer, and illustrative embodiments of the present invention send a correction to a copy of the received e-mail to the mail servers of the e-mail sender and each recipient of the received e-mail. Illustrative embodiments of the present invention also offer the option of prompting the other e-mail recipients of the received e-mail to update their records with the corrected information. To update a record with a correction of information, an e-mail recipient of a received e-mail may electronically update an e-mail address book, electronically update any other electronic record, or manually update a hard copy record.

Figure 3:
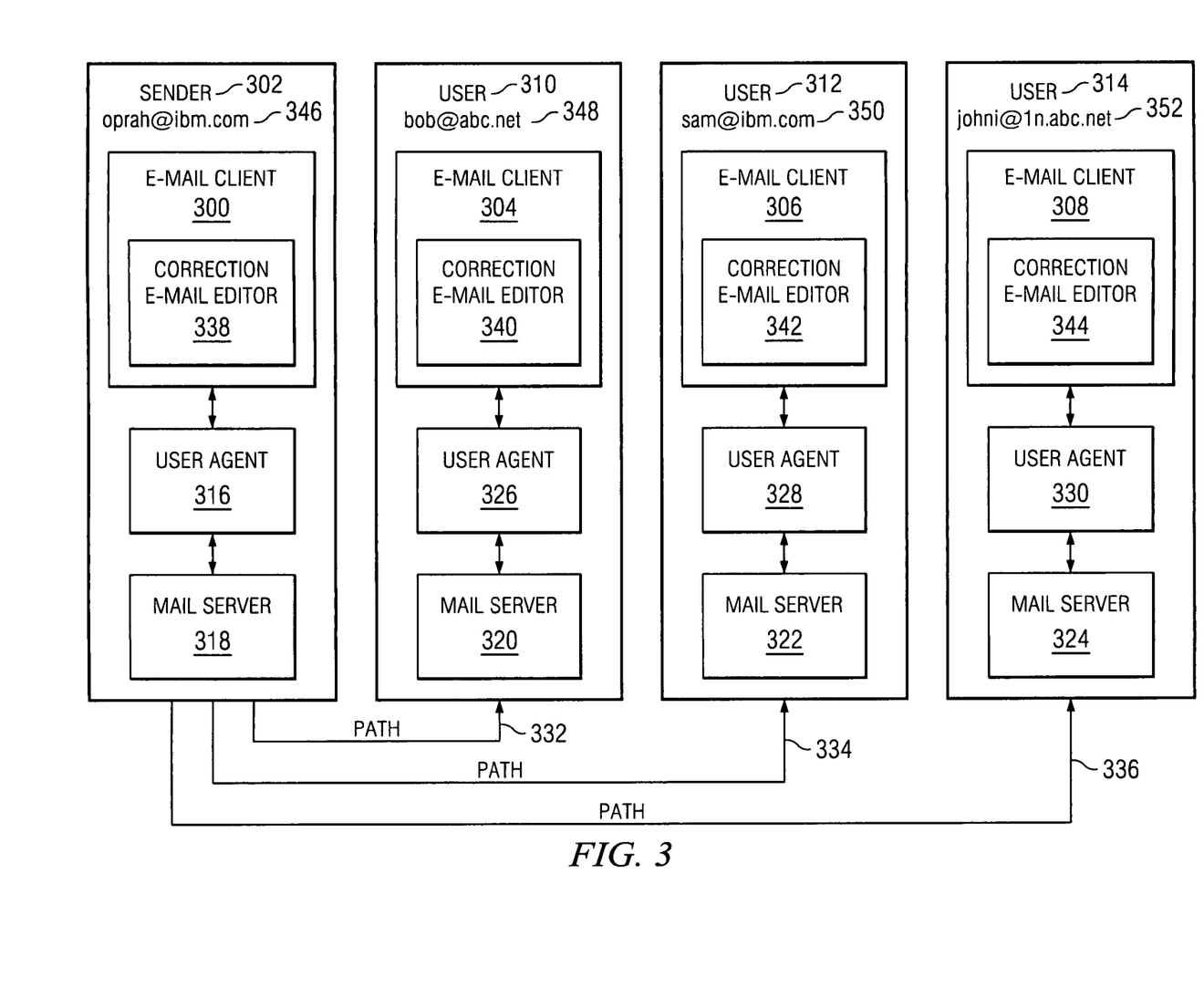
FIG. 3 is a block diagram illustrating a typical interaction between an e-mail sender and mail servers in accordance with an illustrative embodiment of the present invention.

FIG. 3 is block diagram illustrating a typical interaction between an e-mail sender and mail servers depicted in accordance with an illustrative embodiment of the present invention. For example, e-mail client 300 for sender 302, the e-mail sender, may be implemented on a server, such as server 104 in FIG. 1, and the e-mail clients 304, 306, and 308, for recipients, user 310, user 312, and user 314, may be implemented on clients, such as client 110, client 112, and client 114 in FIG. 1. Examples of commercially available e-mail clients include Lotus Notes™, Office Outlook™, and gmail®. Lotus Notes is a trademark of International Business Machines Corporation in the United States, other countries, or both. Office Outlook is a trademark of Microsoft Corporation in the United States, other countries, or both. gmail is a registered trademark of Google Inc. Corporation in the United States, other countries, or both.

Sender 302 composes an e-mail to three different recipients, user 310, user 312, and user 314. A receipt of an e-mail is a receipt in the mailbox of a recipient of an original e-mail sent by an e-mail sender. Sender 302 composes the e-mail using e-mail client 300 and instructs e-mail client 300 to send the e-mail. E-mail client 300 sends the e-mail to user agent 316 which delivers the e-mail to mail server 318 for sender 302. Essentially, e-mail client 300 activates user agent 316 as an application program interface. Mail server 318 delivers the e-mail to the corresponding mail servers 320, 322, 324. Mail servers 320, 322, 324 use user agents 326, 328, and 330 to deliver the e-mail to the mailboxes in e-mail clients 304, 306, and 308. E-mail clients 304, 306, and 308 are for the recipients, user 310, user 312, and user 314, to whom sender 302 has addressed the e-mail. As the e-mail from sender 302 is routed to the network of mail servers 318, 320, 322, and 324 for its destination, path information is stored in the e-mail header. Path information includes a list of the mail servers in the network of mail servers that conveyed the e-mail from the mail server of the e-mail sender to the mail server of the e-mail recipient. Forward and reverse routing paths 332, 334, and 336 are stored by mail servers 318, 320, 322, and 324 in the e-mail header at each hop. The purpose of the path information, such as information about forward and reverse routing paths 332, 334, and 336, is to help mail server 318 to find each destination for each copy of the e-mail. For example, mail server 318 uses path 336 to deliver an e-mail to mail server 324. Mail server 324 uses path 336 for user 314 to reply to the e-mail from sender 302. More detailed descriptions of e-mail clients such as e-mail client 300 and mail servers such as mail server 318 may be found at RFC821 (RFC2821) Simple mail transfer protocol, RFC822 Standard for the format of ARPA Internet text messages, and RFC 2822 Internet message format.

In a prior art example, sender 302 sends an e-mail with erroneous information to e-mail recipients. User 314 receives the e-mail with the erroneous information from sender 302 through e-mail client 308. For example, sender 302 has invited user 310, user 312, and user 314 to meet sender 302 at a restaurant for a business lunch meeting. User 314 notices that sender 302 entered erroneous information in the text of the e-mail which erroneously identifies the address for the restaurant as "1415 Main Street" instead of the correct address of "2415 Main Street."

User 314 responds to the received e-mail by selecting the "reply" option, correcting the erroneous restaurant address, and sending a copy of the received e-mail only to sender 302 the e-mail sender. E-mail client 300 for sender 302 receives the corrected e-mail containing the corrected information from user 314 but user 310 and user 312 still have only the original e-mail with erroneous information, the erroneous restaurant address. In this example, the information is erroneous because it contains the erroneous information, but erroneous information could be erroneous because it omits information. Therefore, if sender 302 does not check for replies to the original e-mail prior to leaving for the business lunch meeting, user 310 and user 312 still have only the original e-mail with erroneous information, the erroneous restaurant address. Even if sender 302 checks for replies to the original e-mail prior to leaving for the business lunch meeting, sender 302 may not forward a copy of the corrected e-mail with the correct information sent by user 314 to user 310 and user 312 until long after user 314 sent the corrected e-mail with the correct information. User 310 and user 312 may have checked their e-mail shortly after user 314 made the correction, but user 310 and user 312 may have stopped checking their e-mail before sender 302 forwarded a copy of the corrected e-mail with the correct information sent by user 314 to user 310 and user 312. Even if user 310 and user 312 read a copy of the corrected e-mail with the correct information forwarded by sender 302, sender 302 had to forward a copy of the corrected e-mail with the correct information to user 310 and user 312 even though user 314 had already sent the corrected e-mail with the correct information.

Alternatively, user 314 responds to the original e-mail by selecting the "reply all" option, correcting the erroneous restaurant address, and sending the corrected e-mail with the correct information to the e-mail sender, sender 302, and the other original recipients, user 310 and user 312. The problem with this alternative is that both user 310 and user 312 will receive two e-mails with essentially the same content, the original e-mail with the erroneous information and the corrected e-mail with the corrected information and essentially the same content as the original e-mail. This problem is amplified when the e-mail sender sends the e-mail to a large number of e-mail recipients. These and similar problems result in greater overhead in terms of data transmission in addition to a tedious correction process.

Additionally, user 310 and user 312 may not notice the correction in the corrected e-mail sent by user 314. Even if user 310 and user 312 notice the correction in the corrected e-mail sent by user 314, if user 310 or user 312 later plan to use the information in the corrected e-mail sent by user 314, either user 310 or user 312 may inadvertently open the e-mail sent by sender 302 instead and use the erroneous information in the original e-mail in an attempt to locate the restaurant.

Each e-mail client, such as e-mail clients 300, 304, 306, and 308, contain a correction e-mail editor, such as correction e-mail editors 338, 340, 342, and 344. Specifics regarding a correcting e-mail editor are discussed below in reference to FIG. 5. The e-mail addresses for sender 302, user 310, user 312, and user 314 are oprah@ibm.com 346, bob@abc.net 348, sam@ibm.com 350, and johni@ln.abc,net 352, respectively.

Embodiments of the present invention send a correction note with a correction to the erroneous information to the mailboxes of the recipients that had received the original message and the mailbox of the e-mail sender. In some embodiments of the present invention this correction note is referred to as a phantom e-mail because the note contains only correction information and no e-mail body. Another reason that the correction note may be referred to as a phantom note is because once the correction note arrives at an e-mail inbox, an e-mail mailbox, for a recipient, the correction note may instruct a user agent not to inform the e-mail client for the recipient about the presence of the correction note. A correcting user agent is a user agent, such as user agent 330 in FIG. 3, for correction notes specifically designed to both send and receive a correction note as well as to carry out instructions given by the correction note. An example of carrying out these instructions is when the correction note instructs the correcting user agent not to inform the e-mail client for the recipient about the presence of the correction note.

When an e-mail sender enters erroneous information such as an erroneous restaurant address when sending an e-mail, each e-mail recipient receives the e-mail with the erroneous information in an inbox, a mailbox for their e-mail client.

Figure 4:
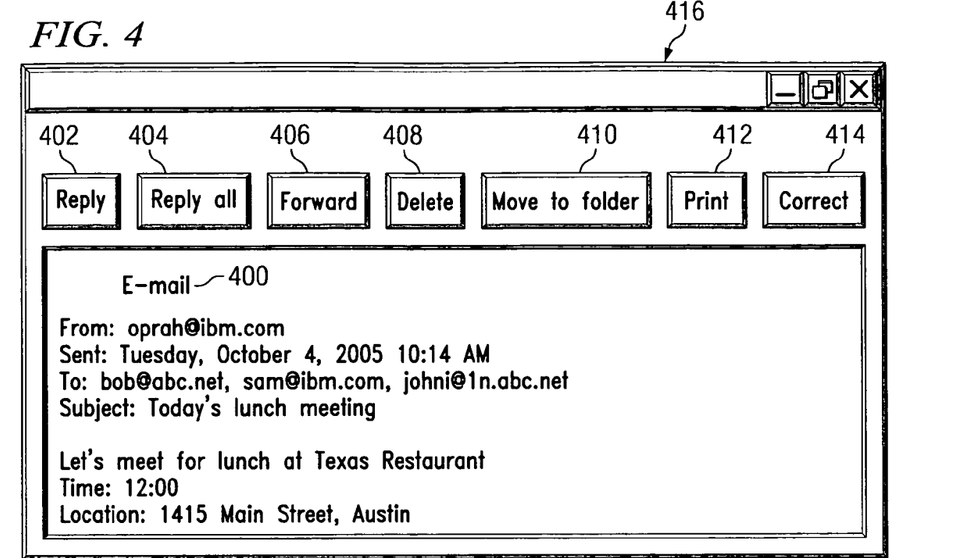
FIG. 4 is a block diagram illustrating a view of an e-mail in a mailbox for an e-mail client in accordance with an illustrative embodiment of the present invention.

FIG. 4 is a block diagram illustrating a view of an e-mail in a mailbox for an e-mail client, such as e-mail client 308 in FIG. 3 depicted in accordance with an illustrative embodiment of the present invention. When viewing an e-mail, an e-mail user has the option of using different options provided by the e-mail client for acting upon an e-mail such as e-mail 400, and these options may include reply 402, reply all 404, forward 406, delete 408, move to folder 410, print 412, and correct 414. These options are offered only as an illustrative example and not to imply any limitation for embodiments of the present invention. The e-mail user may have other options depending upon the e-mail client. Selecting reply 402 enables an e-mail user such as user 314 in FIG. 3 to reply to an e-mail sent by another e-mail user such as sender 302 in FIG. 3. Selecting reply all 404 enables an e-mail user to reply to an e-mail sent by another e-mail user and also to reply to each recipient of the e-mail such as user 310 and user 312 in FIG. 3. Selecting forward 406 enables an e-mail user to forward an e-mail to recipients to be specified by the e-mail user. Selecting delete 408 enables an e-mail user to delete an e-mail. Selecting move to folder 410 enables an e-mail user to move an e-mail to a folder to be specified by the e-mail user. Selecting print 412 enables an e-mail user to print a hard copy of an e-mail.

A selection of a correct option such as correct 414 is an option that enables an e-mail user to correct any erroneous information in an e-mail in a mailbox such as mailbox 416. A selection of a correct option enables an e-mail user to correct the erroneous information in the received e-mail in the mailboxes of the other recipients and the e-mail sender. By selecting correct 414 to reply to an e-mail, the e-mail client for the e-mail recipient may generate a correction note to correct the erroneous information in the received e-mail in the mailboxes for the other recipients and the sender of the received e-mail. In contrast to the selection of reply 402, reply all 404, and forward 406, which use a standard e-mail editor to format an e-mail for composition, the selection of correct 414 uses a correction e-mail editor to format an e-mail for composition. A correction e-mail editor, such as correction e-mail editor 342 in FIG. 3, is an e-mail editor that gives an e-mail user the option of generating a correction note instead of simply correcting an e-mail. A correction e-mail editor formats a copy of a received e-mail when the e-mail editor enables an e-mail user to compose a correction of a received e-mail based upon the received e-mail.

Figure 5:
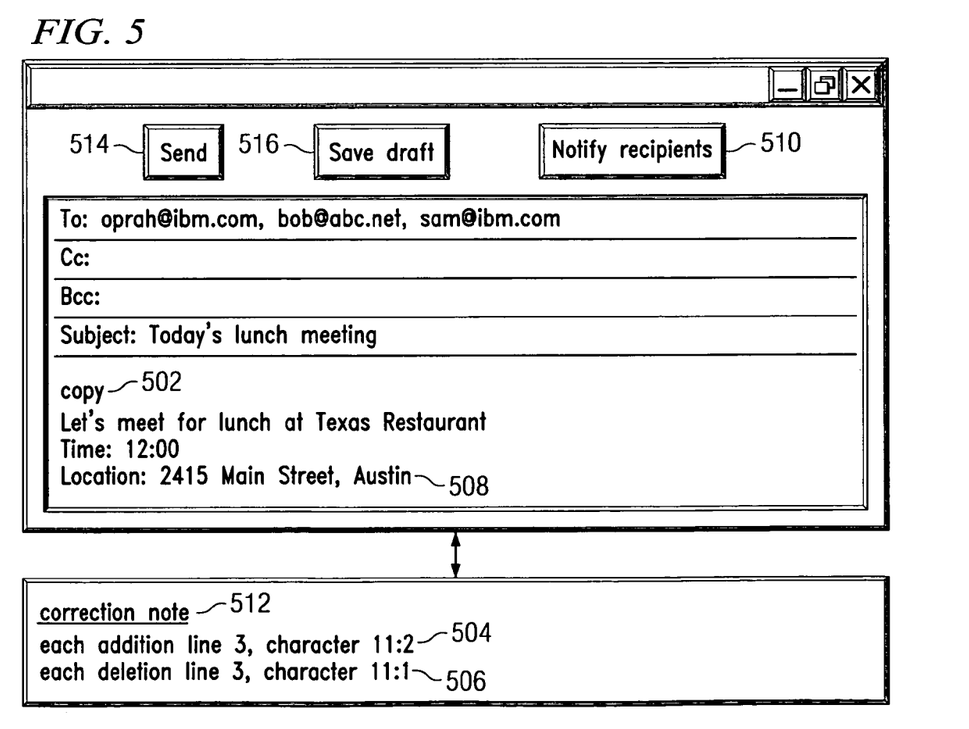
FIG. 5 is a block diagram illustrating a view of an e-mail in an e-mail editor for an e-mail in accordance with an illustrative embodiment of the present invention.

FIG. 5 is a block diagram illustrating a view of an e-mail in a correction e-mail editor for an e-mail client such as e-mail client 308 in FIG. 3 depicted in accordance with an illustrative embodiment of the present invention. The e-mail recipient such as user 314 in FIG. 3 views copy 502 of the original received e-mail such as e-mail 400 in FIG. 4 and makes each addition 504 and each deletion 506 to erroneous information 508 in the e-mail. For example, e-mail user 312 deletes the eleventh character "1" 506 from the third line, which was "Location: 1415 Main Street, Austin," erroneous information 508. In this example, each deletion is the deletion of "1" for the eleventh character of the third line. Then e-mail user 312 adds the eleventh character "2" 504 to the third line, which was "Location: 415 Main Street, Austin," erroneous information 508. In this example, each addition is the addition of "2" for the eleventh character of the third line. A correction of erroneous information in an e-mail is each addition and each deletion to erroneous header information made by an e-mail user.

If an e-mail user selects notify recipients 510, the e-mail sender may select a notify e-mail option. If the notify e-mail option is selected, the correction e-mail editor instructs correction note 512 to notify the e-mail recipients about the existence of correction note 512 that is sent to the e-mail recipients. A notify option is a set of options presented by a correction e-mail editor for an e-mail user to select whether e-mail recipients are notified about a correction note and how a correction to the erroneous information and any annotation may appear in the received e-mail.

The correction e-mail editor stores each addition 504 and each deletion 506 in correction note 512 when the e-mail recipient selects send 514 or save draft 516 as an option presented by the correction e-mail editor of the e-mail client. A correction note is an electronic note that contains each correction which is each addition and each deletion to erroneous header information. The correction note may contain instructions from a correction e-mail editor for a correcting user agent for the e-mail client of the recipient to find and correct the received e-mail for which the correction note is sent. An instruction, such as send 514, for the correction e-mail editor to send the correction note for erroneous information in the e-mail is any instruction made by the e-mail user that indicates the correction note is complete and ready to be sent to each recipient of the original e-mail.

The options mentioned above are offered only as an illustrative example and not to imply any limitation for embodiments of the present invention. The e-mail user may have other options depending upon the standard e-mail editor for the e-mail client. When the e-mail recipient selects send 514, the correction e-mail editor sends correction note 512 to the addresses of the intended recipients.

When an e-mail user selects an option to notify recipients such as notify recipients 510 in FIG. 5 and selects an indicate option, the correction e-mail editor may instruct the correction note to indicate to recipients of the correction note that the received e-mail is seamlessly corrected. An indication to recipients of the correction note that the received e-mail information is seamlessly corrected may be made by displaying the corrected text in a different font size, color, or format such as bold or italics from the original text. Alternatively, the corrected e-mail information may offer a link to the erroneous information. In one embodiment of the present invention, if a recipient of the correction note has already acted on the received e-mail, the recipient of the correction note is notified about the correction note. The recipient of the correction note has already acted on the received e-mail if the recipient of the correction note has already viewed the received e-mail or if the recipient of the correction note has already deleted the received e-mail. If the recipient of the correction note has not already acted on the received e-mail, the recipient of the correction note is not notified about the correction note. Annotations in the corrected information may indicate the identity of the e-mail user that corrected the erroneous information and when the e-mail user corrected the erroneous information.

Alternatively, once a correction note arrives at a recipient's mailbox, the correction note may instruct the correcting user agent for the recipient to notify the e-mail client for the recipient about the correction note. All other features for the correction note remain the same as described above. Notification by the correction note containing corrected information may inform the recipient of the corrected information and prompt the recipient to update a record with the corrected information.

Figure 6:
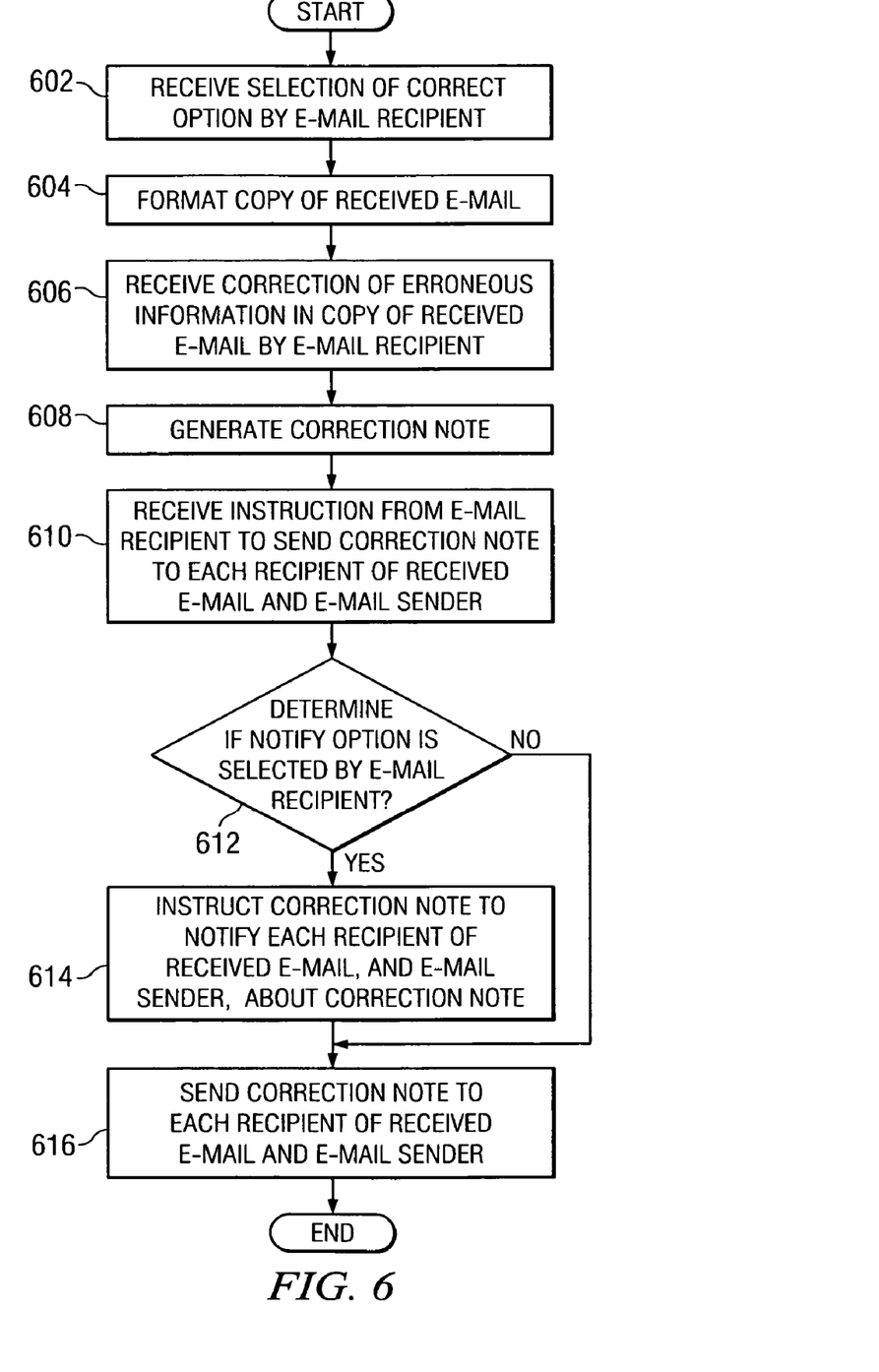
FIG. 6 is a flowchart of a process in a correction e-mail editor that enable an e-mail recipient to correct erroneous information for a received e-mail in accordance with an illustrative embodiment of the present invention.

FIG. 6 is a flowchart of a process in a correction e-mail editor that enable an e-mail recipient to correct erroneous information for a received e-mail, such as e-mail 400 in FIG. 4, in remote mailboxes depicted in accordance with an illustrative embodiment of the present invention. The correction e-mail editor receives a selection of the correct option by the e-mail recipient (step 602). Then the correction e-mail editor formats a copy of a received e-mail (step 604). A received e-mail is an e-mail received by an e-mail recipient that is sent by an e-mail sender. The correction e-mail editor receives a correction of erroneous information in a copy of the received e-mail by the e-mail recipient (step 606). Next, the correction e-mail editor generates a correction note (step 608). The correction e-mail editor receives an instruction from the e-mail recipient to send the correction note to each recipient of the received e-mail and the e-mail sender (step 610). Then the correction e-mail editor determines if a notify option is selected by the e-mail recipient (step 612). If the notify option is selected by the e-mail recipient, the correction e-mail editor instructs the correction note to notify each of the other recipients of a received e-mail, and the e-mail sender, about the correction note (step 614). Regardless of whether the notify option is selected by the e-mail recipient, the correction e-mail editor sends a correction note to each recipient of the received e-mail and the e-mail sender (step 616), with the process terminating thereafter.

Once a correction note, such as correction note 512 in FIG. 5, has arrived at a mail server for a recipient of the note, the correction note instructs a correcting user agent for the e-mail client of the recipient to find and correct the received e-mail for which the correction note was sent. The mail server may be a mail server such as mail server 320, the recipient may be a recipient such as user 310, and the correcting user agent may be a user agent such as user agent 326, all of FIG. 3. The correcting user agent has all of the capabilities of a standard user agent but is also specifically designed to both send and receive a correction note as well as to carry out instructions given by the correction note. The correction note contains a message identification number of the received e-mail for the correcting user agent to use in finding the received e-mail in the e-mail client. The correcting user agent uses the message identification number of the received e-mail to find the received e-mail in the e-mail client by comparing the message identification number of the received e-mail to the message identification number of e-mails in the e-mail client. After the correcting user agent finds the received e-mail in the e-mail client, the correcting user agent uses the correction in the correction note to correct the erroneous information for the received e-mail. A correction to erroneous information is the corrected portion of the information seamlessly integrating the correction made by the e-mail user. The correction note may have each addition and each deletion made by an e-mail user for erroneous information. The correcting user agent may not find the received e-mail if the recipient of the note has already deleted the received e-mail. In this instance, no further processing is necessary, but an indication may be made to the recipient of the correction note that a correction note arrived for the deleted e-mail.

Figure 7A:
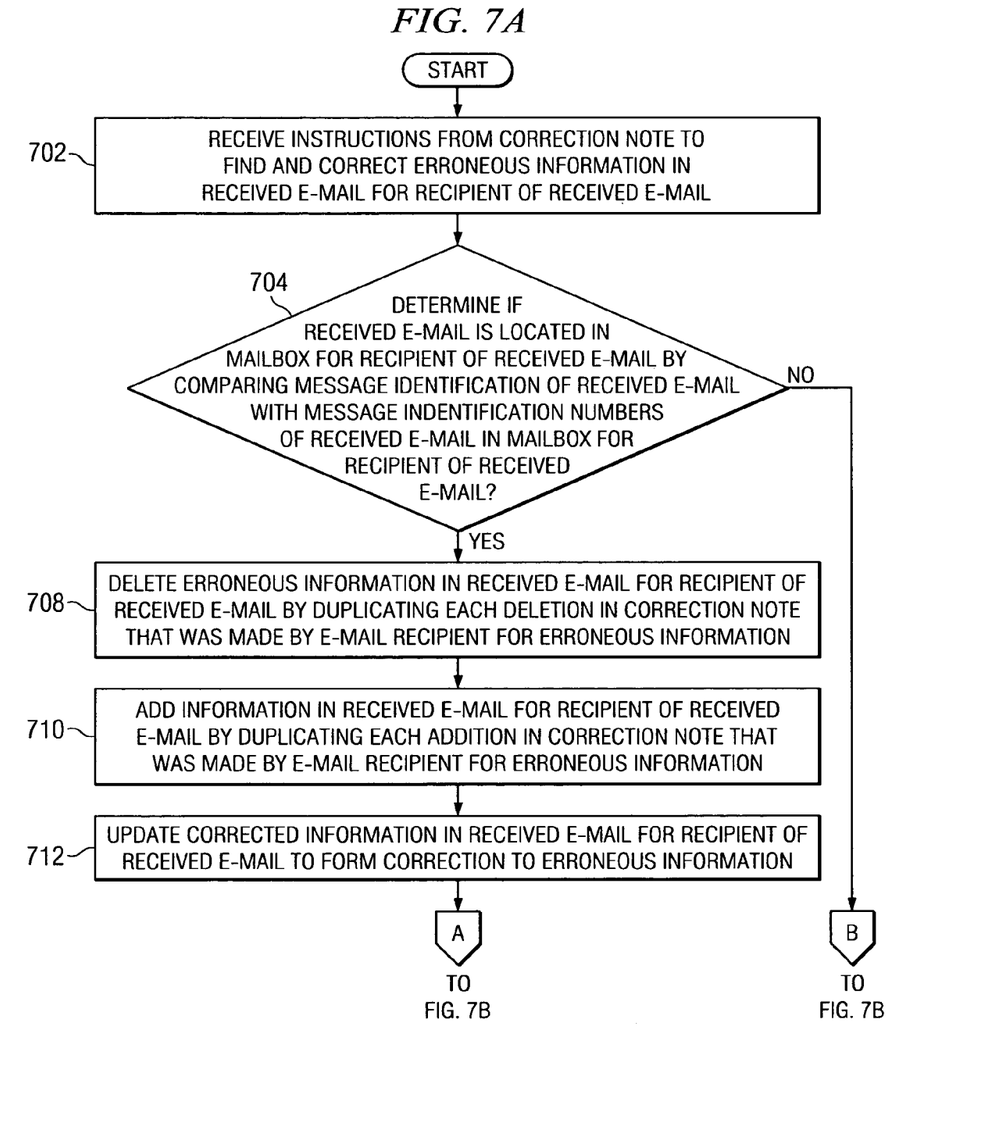
Figure 7B:
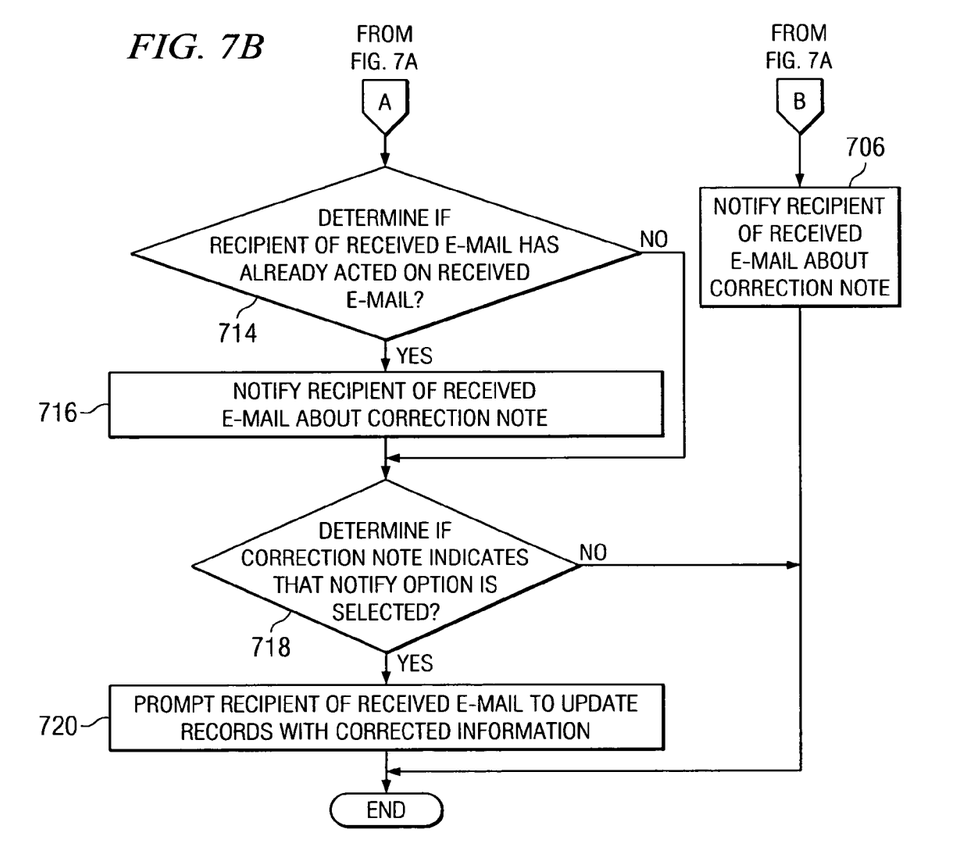

FIG. 7A-7B is a flowchart of a process for a correcting user agent to enable an e-mail recipient to correct erroneous information in a received e-mail in remote mailboxes in accordance with an illustrative embodiment of the present invention. A correcting user agent receives instructions from a correction note to find and correct erroneous information in a received e-mail for a recipient of the received e-mail (step 702). The correcting user agent determines if the received e-mail is located in a mailbox for the recipient of the received e-mail by comparing a message identification of the received e-mail with the message identification numbers of received e-mail in the mailbox for the recipient of the received e-mail (step 704).

In response to a determination that the received e-mail is not located in the mailbox for the recipient of the received e-mail, the correcting user agent notifies the recipient of the received e-mail about the correction note, and the process terminates (step 706). In response to a determination that the received e-mail is located in the mailbox for the recipient of the received e-mail, the correcting user agent deletes erroneous information in the received e-mail for the recipient of the received e-mail by duplicating each deletion in the correction note that was made by the e-mail recipient for the erroneous information (step 708). Next, the correcting user agent adds information in the received e-mail for the recipient of the received e-mail by duplicating each addition in the correction note that was made by the e-mail recipient for the erroneous information (step 710). Then the correcting user agent updates the corrected information in the received e-mail for the recipient of the received e-mail to form a correction to erroneous information (step 712).

The correcting user agent determines if the recipient of the received e-mail has already acted on the received e-mail (step 714). If the correcting user agent determines that the recipient of the received e-mail has already acted on the received e-mail, the correcting user agent notifies the recipient of the received e-mail about the correction note (step 716). The correcting user agent determines if the correction note indicates that the notify option is selected (step 718). If the correcting user agent determines the correction note indicates that the notify option is selected, the correcting user agent prompts the recipient of the received e-mail to update records of the recipient of the received e-mail with the corrected information (step 720), with the process terminating thereafter. In response to a determination that the received e-mail is not located in the mailbox for the recipient, the process terminates.

Each original recipient of the received e-mail and the e-mail sender now have the corrected information as only one e-mail in their respective mailboxes. The next time that a recipient of the correction note opens the corrected e-mail, the corrected information for the received e-mail is displayed.

In summary, when an e-mail sender has entered erroneous information when sending an e-mail and a recipient of the e-mail corrects the erroneous information after receiving the e-mail, embodiments of the present invention correct the erroneous information in the received e-mail in the remote mailboxes of the e-mail recipients of the original e-mail. These features result in a reduction of overhead in terms of data transmission in addition to the elimination of a tedious correction process.

The invention can take the form of an entirely hardware embodiment, an entirely software embodiment, or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device.

The medium can be an electronic, magnetic, optical, electromagnetic, infrared, or semiconductor system (or apparatus or device), or a propagation medium. A computer-readable storage medium includes a semiconductor or solid state memory, magnetic tape, a removable computer diskette, a random access memory (RAM), a read- only memory (ROM), a rigid magnetic disk and an optical disk. Current examples of optical disks include compact disk - read only memory (CD- ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the embodiments of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for electronically correcting information in electronic mail, the method comprising:

receiving an electronic mail at a computer of a recipient of the electronic mail, wherein the electronic mail was sent to the recipient by a sender;

receiving a selection of an option from a plurality of different options from the recipient of the electronic mail, wherein the option selected enables correction of information in the electronic;

responsive to receiving the selection of the option from the plurality of different options, formatting a copy of the electronic mail to compose a correction;

correcting information in the copy of the electronic mail, wherein the information corrected comprises added information and deleted information;

generating a correction note by the computer of the recipient, wherein the correction note stores only the information corrected in the copy of the electronic mail, and wherein the correction note is associated with the electronic mail;

sending the correction note to an electronic mail server; and responsive to receiving a selection of an option to notify an other recipient of the electronic mail and the sender of the electronic mail about the correction note, notifying by displaying an annotation to indicate when the correction of information in the copy of the electronic mail occurred.

2. The method of claim 1, wherein generating the correction note occurs in response to receiving a selection of an option from one of a send option and a save draft option.

3. The method of claim 1, wherein notifying the other recipient of the electronic mail and the sender of the electronic mail about the correction note associated with the electronic mail comprises:

displaying a correction of information in the correction note in one of a different font size, color, and format from one of a corresponding font size, color, and format used for the electronic mail sent by the sender.

4. The method of claim 1, wherein notifying the other recipient of the electronic mail and the sender of the electronic mail about the correction note associated with the electronic mail comprises:

offering a link to erroneous information in the electronic mail.

5. The method of claim 1, wherein notifying the other recipient of the electronic mail and the sender of the electronic mail about the correction note associated with the electronic mail comprises:

prompting the other recipient of the electronic mail and the sender of the electronic mail to update a record with the information corrected.

6. The method of claim 1, wherein notifying the other recipient of the electronic mail and the sender of the electronic mail about the correction note associated with the electronic mail comprises:

determining whether the other recipient of the electronic mail has already acted on the electronic mail; and responsive to a determination that the other recipient has already acted on the received electronic mail, notifying the other recipient of the correction note.

7. A computer program product comprising:

a computer-readable storage medium storing computer readable program code for electronically correcting information in electronic mail;

computer program code for receiving an electronic mail at a computer of a recipient of the electronic mail, wherein the electronic mail was sent to the recipient by a sender;

computer program code for receiving a selection of an option from a plurality of different options from the recipient of the electronic mail, wherein the option selected enables correction of information in the electronic;

computer program code for, responsive to receiving the selection of the option from the plurality of different options, formatting a copy of the electronic mail to compose a correction;

computer program code for correcting information in the copy of the electronic mail, wherein the information corrected comprises added information and deleted information;

computer program code for generating a correction note by the computer of the recipient, wherein the correction note stores only the information corrected in the copy of the electronic mail, and wherein the correction note is associated with the electronic mail;

computer program code for sending the correction note to an electronic mail server; and computer program code for, responsive to receiving a selection of an option to notify an other recipient of the electronic mail and the sender of the electronic mail about the correction note, notifying by displaying an annotation to indicate when the correction of information in the copy of the electronic mail occurred.

8. A data processing system for electronically correcting information in electronic mail, the data processing system comprising:

a bus;

a storage device connected to the bus, wherein the storage device stores computer program code;

a communications unit connected to the bus; and a processing unit connected to the bus, wherein the processing unit is configured to execute the computer program code to receive an electronic mail at a computer of a recipient of the electronic mail, wherein the electronic mail was sent to the recipient by a sender; receive a selection of an option from a plurality of different options from the recipient of the electronic mail, wherein the option selected enables correction of information in the electronic; format a copy of the electronic mail to compose a correction in response to receiving the selection of the option from the plurality of different options; correct information in the copy of the electronic mail, wherein the information corrected comprises added information and deleted information; generate a correction note by the computer of the recipient, wherein the correction note stores only the information corrected in the copy of the electronic mail, and wherein the correction note is associated with the electronic mail; send the correction note to an electronic mail server; and notify by displaying an annotation to indicate when the correction of information in the copy of the electronic mail occurred in response to receiving a selection of an option to notify an other recipient of the electronic mail and the sender of the electronic mail about the correction note.

* * * * *